(12) United States Patent
Delp et al.

(10) Patent No.: US 6,667,978 B1
(45) Date of Patent: Dec. 23, 2003

(54) APPARATUS AND METHOD FOR REASSEMBLING FRAME DATA INTO STREAM DATA

(75) Inventors: Gary Scott Delp, Rochester, MN (US); Albert Alfonse Slane, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/112,470

(22) Filed: Jul. 9, 1998

(51) Int. Cl.[7] .............................. H04J 3/22; H04L 12/56
(52) U.S. Cl. ..................................... 370/395.1; 370/470
(58) Field of Search .............................. 370/395.1, 397, 370/399, 409, 470, 472, 474

(56) References Cited

U.S. PATENT DOCUMENTS

| | | | |
|---|---|---|---|
| 5,136,584 A | * 8/1992 | Hedlund | 370/399 |
| 5,297,139 A | * 3/1994 | Okura et al. | 370/428 |
| 5,533,021 A | 7/1996 | Branstad et al. | |
| 5,537,408 A | 7/1996 | Branstad et al. | |
| 5,544,161 A | * 8/1996 | Bigham et al. | 370/58.1 |
| 5,606,559 A | * 2/1997 | Badger et al. | 370/395 |
| 5,652,749 A | 7/1997 | Davenport et al. | |
| 5,664,116 A | * 9/1997 | Gaytan et al. | 395/200.64 |
| 5,717,691 A | * 2/1998 | Dighe et al. | 370/401 |
| 5,742,599 A | * 4/1998 | Lin et al. | 370/395 |
| 5,790,544 A | * 8/1998 | Aho et al. | 370/395 |
| 5,822,612 A | * 10/1998 | Thomas et al. | 395/826 |
| 5,856,975 A | * 1/1999 | Rostoker et al. | 370/395 |
| 5,917,828 A | * 6/1999 | Thompson | 370/474 |
| 6,026,088 A | * 2/2000 | Rostoker et al. | 370/395 |
| 6,097,734 A | * 8/2000 | Gotesman et al. | 370/474 |

* cited by examiner

*Primary Examiner*—Steven Nguyen
*Assistant Examiner*—Toan Nguyen
(74) *Attorney, Agent, or Firm*—Bracewell & Patterson LLP

(57) ABSTRACT

The present invention is a method and apparatus for reducing processing overhead using a stream data reassembly mechanism and at least one data buffer. The present invention pre-processes incoming frames before delivering the frames to system memory. When a first packet of an data stream is received, the data from the packet is placed into a data buffer. Information about the first packet is stored in a logical channel descriptor (LCD) to indicate that data exists in the current data buffer. As each subsequent packet in the data stream is received, the reassembly mechanism removes extraneous transmission data from the packet and checks the CRC of each trailer to qualify the data within the packet. After the data is qualified, the reassembly mechanism stores the data portion of the packet in the data buffer. This preprocessing of each packet continues until a predetermined condition is met. Once a predetermined condition is met, the reassembly mechanism will make the contents of the buffer available to the system. The reassembly may optionally associate a direct memory access (DMA) descriptor with the buffer and burst the contents of the buffer into system memory. The reassembly mechanism of the present invention thereby reduces the amount of data reception interrupts processed by the system and can also reduce the number of direct memory access data transfer across the system bus.

39 Claims, 12 Drawing Sheets

| SYNTAX | NO. OF BITS |
|---|---|
| TRANSPORT_PACKET(){ | |
|   SYNC_BYTE | 8 |
|   TRANSPORT_ERROR_INDICATOR | 1 |
|   PAYLOAD_UNIT_START_INDICATOR | 1 |
|   TRANSPORT_PRIORITY | 1 |
|   PID | 13 |
|   TRANSPORT_SCRAMBLING_CONTROL | 2 |
|   ADAPTATION_FIELD_CONTROL | 2 |
|   CONTINUITY_COUNTER | 4 |
|   IF(ADAPTATION_FIELD_CONTROL = "10" IF ADAPTATION_FIELD_CONTROL = "11" ){ | |
|     ADAPTATION_FIELD() | |
|   } | |
|   IF(ADAPTATION_FIELD_CONTROL = "01" IF ADAPTATION_FIELD_CONTROL = "11" ){ | |
|     FOR (I=0;i<B;I++) } | |
|     DATA_BYTE | 8 |
|   } | |
| } | |

```
SYNTAX                                              NO. OF
ADAPTATION_FIELD(){                                 BITS
  ADAPTATION_FIELD_LENGTH                           8
      IF(ADAPTATION_FIELD>0){
           DISCONTINUITY_INDICATOR                  1
           RANDOM_ACCESS_INDICATOR                  1
           ELEMENTARY_STREAM_PRIORITY_INDICATOR     1
           PCR_FLAG                                 1
           OPCR_FLAG                                1
           SPLICING_POINT_FLAG                      1
           TRANSPORT_PRIVATE_DATA_FLAG              1
           ADAPTATION_FIELD_EXTENSION_FLAG          1

IF(PCR_FLAG="1"){
       PROGRAM_CLOCK_REFERENCE_BASE                 33
       RESERVED                                     6
       PROGRAM_CLOCK_REFERENCE_EXTENSION            9

IF(OPCR_FLAG="1"){
       ORIGINAL_PROGRAM__BASE                       33
       RESERVED                                     6
       ORIGINAL_PROGRAM_REFERENCE_EXTENSION         9

IF(SPLICE_POINT_FLAG="1"){
       SPLICE_COUNTDOWN                             8

IF(TRANSPORT_PRIVATE_DATA_FLAG="1"){
       TRANSPORT_PRIVATE_DATA_LENGTH                8
       FOR (I=0;I<TRANSPORT_PRIVATE_DATA_LENGTH;I++){
       PRIVATE_DATA_BYTE                            8
                          *
                          *
                          *
```

APPARATUS AND METHOD FOR REASSEMBLING FRAME DATA INTO STREAM DATA

BACKGROUND OF THE INVENTION

1. Technical Field

This invention generally relates to digital communication. More specifically, this invention relates to the reception of multimedia or other stream data from one location to another.

2. Background Art

The development of the EDVAC computer system of 1948 is often cited as the beginning of the computer era. Since that time, computer systems have evolved into extremely sophisticated devices, and computer systems may be found in many different settings. Modem computer systems vary in their design and architecture, with many different models available to achieve the desired combination of speed, power and efficiency for any given computing environment.

In addition, most computer systems are used for a wide variety of tasks and, therefore, need to be flexible and versatile enough to change with the varying requirements of the computer user over time. For example, as the number of computer users on a given computer network increases, additional network components such as network cards and cables/adapters may need to be added. Further, as organizational changes occur, the type and quantity of data being stored and processed may also change, requiring new or additional equipment such as external secondary storage devices.

Given the increased power of modem computer systems, new uses for computers are continually being developed. One very rapidly expanding area of use for high-end computer systems is the processing of complex data streams such as audio and video information. While complex data streams can be represented in the digital language of computers, this type of information typically requires very large files to capture any significant amount of data. For example, 100 to 200 seconds of CD quality audio can require a file as large as 20 Mbytes. Full screen video, even relatively short segments, can quickly fill and exceed the capacity of even the largest of presently available storage devices. In addition, transferring audio and video data streams over computer networks consumes a significant amount of time and can be very expensive.

In order to combat the various storage and transmission related problems associated with complex data streams, several compression algorithms and processing techniques have been developed. One of the most popular standards for compressing, storing, and transmitting multi-media audio and video-related information is the Moving Picture Experts Group (MPEG) standard. MPEG is a common acronym used for the name of family of standards used for coding audio-visual information (e.g., movies, video, music) in a digital compressed format. Using the MPEG standard, audio and video data is stored in fixed-size units known as "frames." The size of each frame is standardized to hold a predetermined amount of data.

The major advantage of using MPEG compression techniques, compared to other video and audio compression standards, is that MPEG files generally retain enough information to preserve the quality of the original signal and are generally much smaller than files with a similar level of quality created by competing standards. This is because the MPEG standard uses very sophisticated compression techniques.

Multimedia audio and video data streams, such as MPEG data streams are typically transferred over networks which are specially adapted for the transmission of digital multimedia data. These specialized networks are very useful since they support integrated networking, scalable bandwidth, and scalable distances. In order to facilitate the transfer of audio and video data across a digital network, the packets of the standard multimedia data stream are broken up into smaller fixed sized units called "cells." Cells are used as a way of transferring blocks of multimedia data because the smaller cells are simple to handle, are of a known size and duration, are more easily adapted to various types of transmission media, and provide a standardized format for transferring multimedia data. The size of the cells is selected so as to allow for easy transfer of the data, error checking, network control, etc. By using small cells, multimedia data can be successfully transmitted from one location to another via the digital network.

While the use of cells is desirable for the transmission of multimedia data, once the cells containing the multimedia data are received at the destination computer system, they must be transformed back into a standard multimedia signal which can be readily processed by the destination computer. In standard transmission protocols, the destination computer has the responsibility of reassembling the transmitted cells back into the original frames. Existing processing hardware will reassemble the received cells into frames and alert the receiving computer of the presence of each new frame, once the frame has been assembled. When a given frame has been received, assembled, and is ready for use by the system, the receiving system is notified of the existence or reception of the frame.

The receiving system is usually alerted to the presence of each new frame by a signal from the processing hardware. The signal can be provided in many ways, including the generation of an "interrupt" signal to notify the receiving system of the availability of a new frame containing multimedia data. Alternatively, the receiving system may periodically "poll" or check predetermined memory locations to ascertain whether or not any new frames have been assembled and are available for use by the destination system. While effective, this process is also less than optimal and requires a certain amount of system overhead.

In the first solution described above, a new interrupt signal is generated for each frame that is received and assembled, meaning that the processor for the destination system is interrupted each time a new frame is ready. With the second solution described above, the destination system will be unaware of the arrival of a new frame until the system interrupts its normal processing and polls the system. The number and frequency of interrupts and processing required to notify the destination system of new frames results in significant quantities of additional CPU overhead and potential inefficiency. For example, in one typical application or processing environment, a new packet can arrive every 20 $\mu$s, resulting in 50,000–200,000 interrupts per second for a standard connection. This constant flow of interrupts can significantly reduce the operating efficiency of the receiving computer system. Given the current industry focus in the generation, storage, and transmission of multimedia data, it is anticipated that the frequency of transmission and related processing of multimedia signals will only increase in the future.

Without a more effective mechanism for transferring and reassembling multimedia and other types of stream data, the use of high-quality audio and video data streams will continue to be limited to those organizations which can absorb the cost and overhead of the presently defined performance limits. In addition, many existing computer systems will continue to perform at less than optimal levels and provide less efficient processing methods for multimedia information than might otherwise be possible.

BRIEF SUMMARY OF THE INVENTION

A preferred embodiment of the present invention reduces system processing overhead by using a reassembly mechanism. The present invention pre-processes incoming frames such as AAL 5 frames before delivering the frames to system memory. When the first packet of an MPEG or other similar data stream is received, the data from the packet is placed into a data buffer. Information about the first packet is stored in the logical channel descriptor (LCD) to indicate that data exists in the current data buffer.

As each subsequent packet in the data stream is received, the reassembly mechanism removes extraneous transmission data from the packet and checks the Cyclical Redundancy Code (CRC) of each trailer to verify or qualify the data contained within the packet. After the data is qualified, the reassembly mechanism stores the data portion of the packet in the data buffer. This preprocessing of each packet continues until a predetermined condition is met, (i.e. the data buffer is full or all packets in the transmitted data stream have been received).

Once the predetermined condition is met, the reassembly mechanism may associate a direct memory access (DMA) descriptor with the buffer and the reassembly mechanism bursts the contents of the data buffer into system memory. The reassembly mechanism reduces the amount of interrupts received by the processor and can also reduce the number of DMA data transfers across the bus. Using the methods of the present invention in one typical processing environment, the overhead on the receiving side can be reduced from 50,000 interrupts per second to 1,162 interrupts per second. For purposes of explanation, the preferred embodiment will be described in general terms, using MPEG-2 multimedia data streams. However, it should be noted that the present invention is generally useful for turning frame data into block data and may be readily adapted for preprocessing other types of data as well.

BRIEF DESCRIPTION OF THE DRAWINGS

The preferred exemplary embodiments of the present invention will hereinafter be described in conjunction with the appended drawings, where like designations denote like elements, and:

FIG. 10 is a chart illustrating a transport stream packet suitable for use with the preferred embodiments of the present invention;

FIG. 11 is a chart illustrating a transport stream adaptation field suitable for use with the preferred embodiments of the present invention;

BEST MODE FOR CARRYING OUT THE INVENTION

Figure 1:
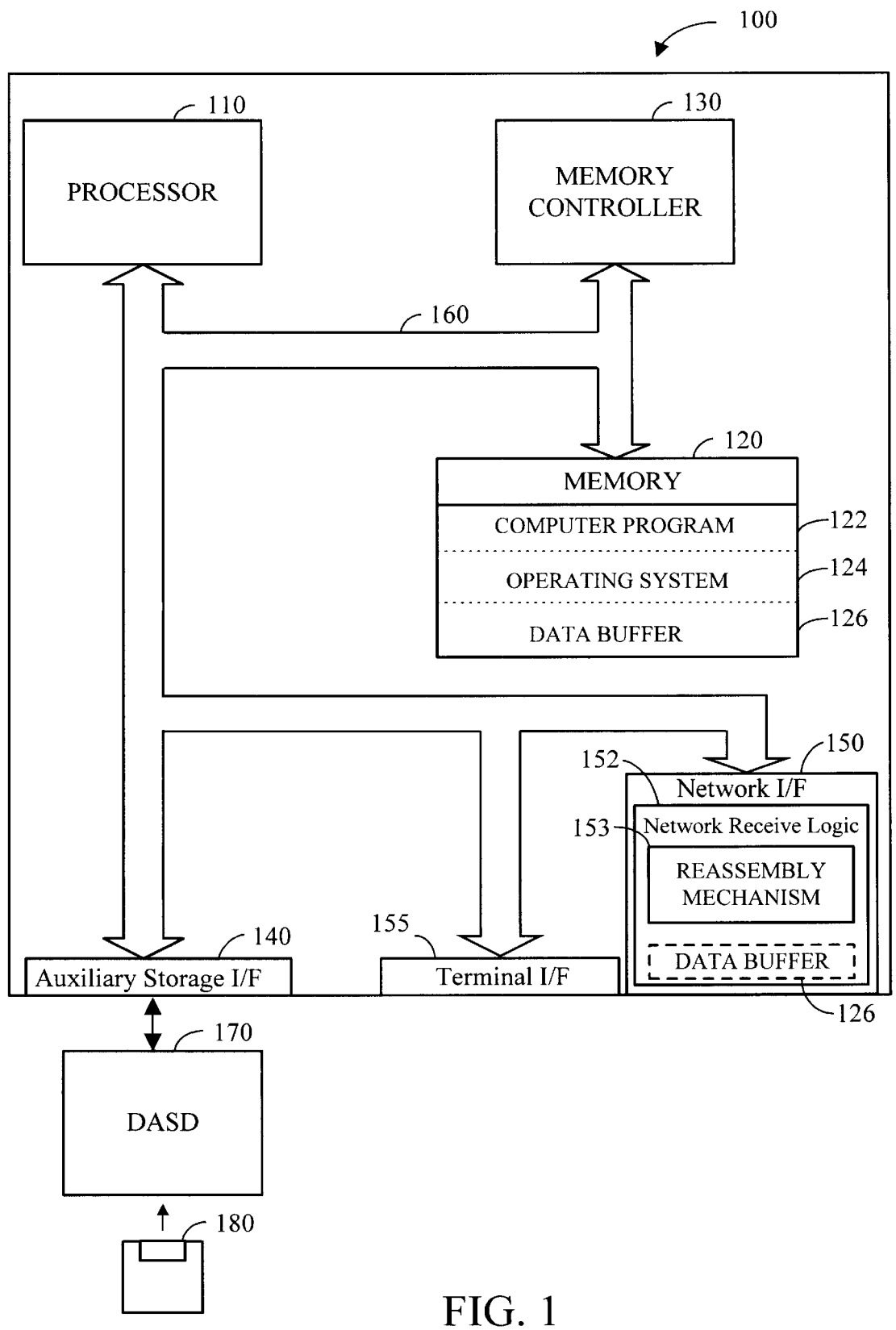
FIG. 1 is a block diagram of a system in accordance with a preferred embodiment of the present invention.

The present invention relates to transferring data from a first location to a second location over a network. For those individuals who are not generally familiar with networks and data communication using the MPEG standard, the Overview section below presents many of the basic concepts and terminology necessary to understand the present invention. Individuals skilled in the art of network communication and MPEG transfers may wish to skip the overview and proceed directly to the Detailed Description section of this specification.

1. Overview

MPEG is a common acronym used for the name of family of standards used for coding audio-visual information (e.g., movies, video, music) in a digital compressed format and the name of the standards group which formulates and promulgates the MPEG standards. The official name of the Moving Picture Experts Group is: ISO/IEC JTC1 SC29 WG11. The major advantage of using MPEG compression techniques compared to other video and audio coding standards is that MPEG files retain enough information to preserve the quality of the original signal and are generally much smaller than files with a similar level of quality created by competing standards. This is because MPEG uses very sophisticated compression techniques.

There are two different ways to store MPEG data. MPEG data can be stored in a program stream which is made up of large blocks of MPEG data. Alternatively, MPEG data can be stored in a transport stream which is made up of multiplexed program stream, and represented in a series of 188 byte transport stream packets. MPEG multimedia streams are typically transported over digital networks called asynchronous transfer mode (ATM) networks, promulgated by international telecommunications union (ITU). ATM networks are very useful since they support integrated networking, scalable bandwidth, and scalable distances. In order to transport MPEG data across an ATM network, the MPEG data stream must be broken up into fixed sized units called cells. Each cells is 53 bytes long, with 48 bytes of data and 5 bytes of cell header information. The 5 bytes of cell header include 4 bits of generic flow control or 4 bits of virtual path identifier (VPI), 8 additional bits of VPI, 16 bits of virtual circuit identifier (VCI), 3 bits of packet type indicator including the user indicate (UI) bit, and 1 bit of cell loss priority. ATM uses the nomenclature "cells" to designate these fixed sized data units.

ATM uses a set of standard protocols, called the ATM Adaptation Layers (AALs) to translate user traffic from higher layers in the protocol stack into a size and format compatible with an ATM cell. The AAL also translates cells back into original form once received at their destination. The particular protocol discussed in this application is AAL 5, which handles variable size data packets with low overhead. Further, AAL 5 allows for simple and efficient transport of frame traffic.

The AAL 5 transport protocol produces variable sized frames filled with ATM cells which are delivered by the ATM network. The contents of an AAL-5 frame include the data to be transferred, 0 to 47 bytes of filler, 2 user bytes, 2 bytes of data length and 4 bytes of cyclic redundancy check (CRC-32). An AAL-5 frame is segmented and carried as the data portion of a consecutive series of ATM cells on a virtual circuit.

Standard AAL-5 frames can be filled with n MPEG packets for transmission. An MPEG packet is 188 bytes of MPEG data. The size of n is subject to an end-to-end negotiation which depends on many factors. There are a number of factors which make it convenient for n to be large such as software overhead on the transmission and/or receiving side. If the receiver is able to tolerate delay, making n large reduces the number of interrupts needed to process the data. Reducing the number of interrupts allows a smaller computer system to be used for receiving more streams of data. There are also a number of factors which make it convenient for n to be a small number. Variation of the mean arrival times of packets is called jitter and may result in the reduction of the quality of voice or video applications. Providing for a small n may allow a reduction of jitter in some networks. Buffer management considerations may also indicate a smaller n.

It has been found that improved efficiency results from placing two 188 byte MPEG packets in an AAL 5 frame along with an 8 byte trailer. This amounts in a total data area of 384 bytes. The 8 byte trailer contains 2 user bytes, 2 bytes indicating the length of 376 bytes and 4 bytes of cyclic redundancy check (CRC). Since each ATM cell is 48 bytes, exactly 8 ATM cells are needed to transport the complete AAL 5 frame. It is desirable to efficiently pack MPEG transport stream packets into an AAL 5 frame in this manner so that the ratio of useful bits transmitted over the network is maximized.

However, a typical transmission using 376 data byte AAL 5 frames, with each frame containing two 188 byte transport stream packets, can cause great stress on the receiver. The receiver has the responsibility of reassembling the ATM cells into the original MPEG data stream. Existing hardware will reassemble received ATM cells into AAL 5 frames and "surface" each frame to the system. In this specification, the term "surface" and "surfacing" refers to the process of notifying the destination or receiving computer system of the existence of a new frame of data or some other information related to the new frame of data. Therefore, whenever a frame is "surfaced to the system," the system is notified of the existence or reception of the frame. As explained above, a frame can be surfaced in one of many ways including providing an interrupt to notify the system or by creating a data structure in a memory location that can be polled by the system to determine the existence of each new frame.

A logical channel descriptor (LCD) for each distinct cell stream is located at the receiver and includes several different critical types of data used during pre-processing. The LCD is a data structure used during cell reassembly and frame surfacing. The LCD includes information such as a data buffer pointer which denotes the data buffer where data from cells is currently being stored, a data offset, a maximum buffer size, a receive threshold to terminate the use of a data buffer, current CRC-32, current AAL-5 frame length, and the start of the current AAL-5 frame.

Figure 3:
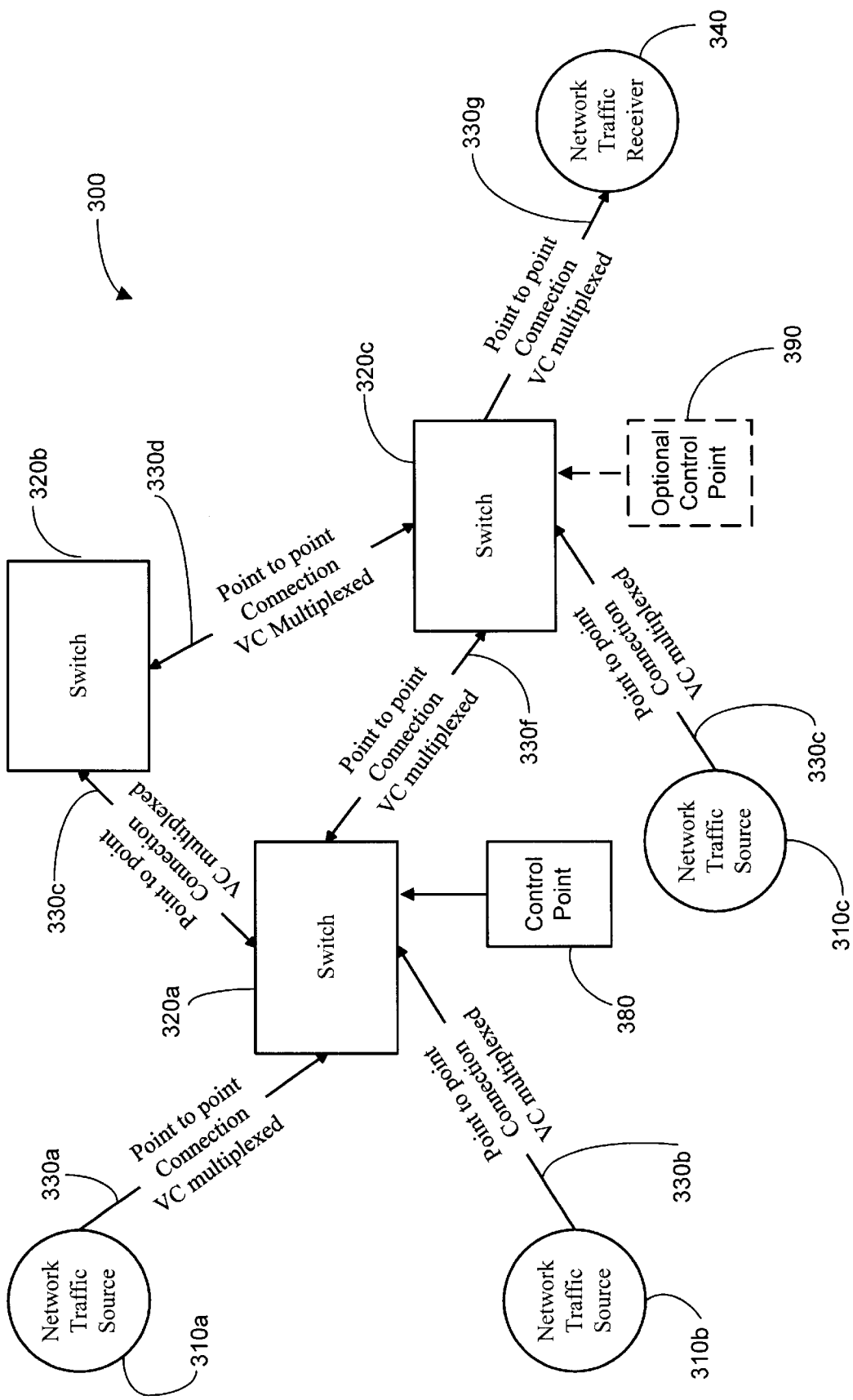
FIG. 3 is a block diagram of a typical cell-switching network.

Referring now to FIG. 3 a typical cell switching network 300 is shown. Network 300 can generally be described as a number of devices, such as computers, linked together by communications media. Communications media allow the devices to easily exchange information.

Network 300 shown in FIG. 3 is made up of sources 310 which provide information to switches 320 over point to point communication lines 330. Switches 320 provide information received from sources 310 to receiver 340, also via point to point communication lines 330. Control point 380 and optional control point 390 provide for certain control functions in network 300.

Several different methods can be used to switch data in communications networks, however, only the cell-switching method will be described in this specification. Those skilled in the art will recognize that the methods of the present invention may be readily adapted to other environments such as packet-switching networks. Cell-switching networks break up streams of information into fixed-length cells at the message source. In FIG. 3, it should be assumed that sources 310 are message sources which break up information streams into fixed-length cells (not shown).

Cell switching networks dynamically establish connections across the network. A dynamically established connection across the network can be called a virtual circuit. Cells in a data stream are then statically routed along the virtual circuit to the receiver. Since each cell is sent over the same virtual path, the cells will arrive at the receiver in the same order as they were sent. This eliminates the need for the receiver to reorder the data stream. A computer algorithm determines the most optimal route for the cells when the virtual circuit is established.

A default configuration establishes a virtual circuit between each end station and at least one control point inside the network. A defined communications protocol is exercised between the end station and the control point by which the end station may request a new virtual circuit, close a virtual circuit or respond to a request from the control point to establish a new circuit based on a request from another end station.

Control point 380 (and optional control point 390) in the network is responsible for configuring the end stations and the intermediate switches to provide for a complete path through the network for each virtual circuit established. Control point 380 is also responsible for releasing the configured resources when a virtual circuit is terminated. Control point 380 may be a single element in the network (as FIG. 3 suggests), or the control point function may be distributed as equipment connected to switches throughout the network.

In order to provide an example of routing cells through a cell switching network, it can be assumed in FIG. 3 that a cell (not shown) originates with source 310a. Source 310a fills in the ATM cell header with the VPI/VCI pair that corresponds to the virtual circuit being used for the data to be transmitted. The cell is then transmitted on the interface of 310a that is connected to the link labeled 330a.

When the cell is received by switch 320a, the switch performs a lookup based on the interface and link identifier, the VPI, and potentially the VCI. Using the virtual circuit routing data provided by the control point 380, at connection setup time for the virtual path and circuit, switch 320a determines the outbound port, and the outbound VPI/VCI (which is potentially different from the input VPI/VCI) to be included in the outgoing cell. In this example, the outgoing port will be connected to communication link 330f. A lookup and re-label and route operation will likewise be performed in switch 320c, and again in this example, the cell data with a re-labeled header will be transmitted on link 330g to receiver 340.

Once a virtual circuit is established in a cell switching network, all cells in a data stream will use that virtual circuit to travel from the source to the receiver. In a cell switching network individual cells in a cell stream will arrive in order or not at all. All cells will be received in order because all cells take the same route across the network to the receiver. A cell switching network receiver can detect an incorrect transmission by comparing the length of the frame against the AAL-5 data, or detecting a CRC which does not match the CRC of the data received.

When using a cell switching network, a cell stream from one source may be mixed with a cell stream from another source in a practice known as interleaving. This can occur in many situations. For example, interleaving may occur when two or more data streams use physical wire or fiber to transmit cells across the cell switching network. Or, a single source could also transmit cells through multiple virtual circuits using one port which would also cause interleaving at the receiver. The receivers are designed assuming interleaving. As each cell arrives, the receiver checks the values assigned to the virtual path indicator (VPI) and virtual circuit indicator (VCI) in the header of the cell. The values assigned to the VPI and VCI depend upon the virtual circuit taken to reach the receiver. The values assigned to these fields allows the receiver to distinguish between different data streams. There is a control structure assigned for each unique value in the VPI or VCI. For example, when a first cell contains a VCI with a value A and a second cell with a VCI with the value B there is a LCD for the data stream across virtual circuit A and a second LCD for the data stream across virtual circuit B.

2. Detailed Description

A preferred embodiment of the present invention utilizes a reassembly mechanism to reduce processing overhead of packets received over a network. The reassembly mechanism reduces processing overhead by reassembling the cells of a data stream back into data blocks for use by the receiving system. By accomplishing this task prior to notifying the receiving system, the reassembly mechanism interrupts the CPU or processor of the receiving system far less frequently than is necessary with existing systems.

Referring now to FIG. 1, a system 100 in accordance with a preferred embodiment of the present invention is an enhanced IBM AS/400 mid-range computer system. However, those skilled in the art will appreciate that the methods and apparatus of the present invention apply equally to any computer system or digital communications system, regardless of whether the computer system is a complicated multi-user computing apparatus or a single user device such as a personal computer, workstation, hand held device or other digital data manipulating device such as a set top box, camera or video monitor. Computer system 100 suitably comprises a processor 110, main memory 120, a memory controller 130, an auxiliary storage interface 140, a network interface 150 and a terminal interface 155, all of which are interconnected via a bus 160. Note that various modifications may be made to computer system 100 illustrated in FIG. 1 within the scope of the present invention, such as adding peripheral devices. FIG. 1 is presented to simply illustrate some of the salient features of computer system 100.

Processor 110 performs computation and control functions of computer system 100, and comprises a suitable processor or central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, is responsible for control signals to move, store, and retrieve requested data from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Network interface 150 allows computer system 100 to connect to a network. Through network interface 150, system 100 can send and receive packets of information transferred over a network. Examples of potential networks that computer system 100 can be connected to include packet and cell switching networks. Network interface 150 includes a network receive logic mechanism 152 which allows computer system 100 to receive and process data including MPEG data, in accordance with a preferred embodiment of the present invention. It should be noted that network interface 150 may also contain one or more data buffers 126 for use with receiving and processing data sent to system 100 via a network.

Network receive logic 152 includes a reassembly mechanism 153. Although reassembly mechanism 153 is shown as part of network receive logic 152, reassembly mechanism 153 may be located anywhere between network receive logic 152 and processor 110. Reassembly mechanism 153, along with one or more buffers 126 is used to process and reassemble cell data received by system 100. The operation of reassembly mechanism 153 is described below.

Terminal interface 155 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

Main memory 120 suitably contains a computer program 122, an operating system 124, and one or more data buffers 126. Computer program 122 in memory 120 is used in its broadest sense, and includes any and all forms of computer programs, including source code, intermediate code, machine code, and any other representation of a computer program. The term "memory" as used herein refers to any storage location in the virtual memory space of system 100.

It should be understood that main memory 120 will not necessarily contain all parts of all mechanisms shown. For example, portions of computer program 122 and operating system 124 may be loaded into an instruction cache (not shown) for processor 110 to execute, while other files may well be stored on magnetic or optical disk storage devices (not shown).

It should also be understood that data buffer 126 may not necessarily reside within memory 120. Data buffer 126 is shown residing within memory 120 only to provide one example of a suitable location to be used in accordance with network receive logic mechanism 152. Another acceptable location for data buffer 126 is a PCI card and this embodiment shall be described in a subsequent figure. In addition, although computer program 122 is shown to reside in the same memory location as operating system 124, and data buffer 126, it is to be understood that main memory 120 may consist of multiple disparate memory locations.

To facilitate increased versatility for a wide range of users, many modern computers, such as the IBM AS/400, use expansion slots known as Peripheral component Interconnect (PCI) slots. PCI slots provide an industry standard expansion card/slot interface which allows different types of PCI Input Output Adaptors (PCIIOA cards or "PCI cards") to be quickly and easily added to an existing computer system. These PCI cards can be configured with various hardware/software capabilities to a computer (i.e. expa-processor capabilities, etc.). A preferred embodiment of the present invention uses a PCI card which has been configured to include a data buffer 126 for preprocessing MPEG packets. A PCI card in accordance with a preferred embodiment of the present invention can be used with any of several computer systems such as an AS/400, a RS/6000, or a personal computer. As mentioned above, data buffer 126 can also reside within a dedicated or designated area of computer system memory (as shown in FIG. 1).

Figure 2:
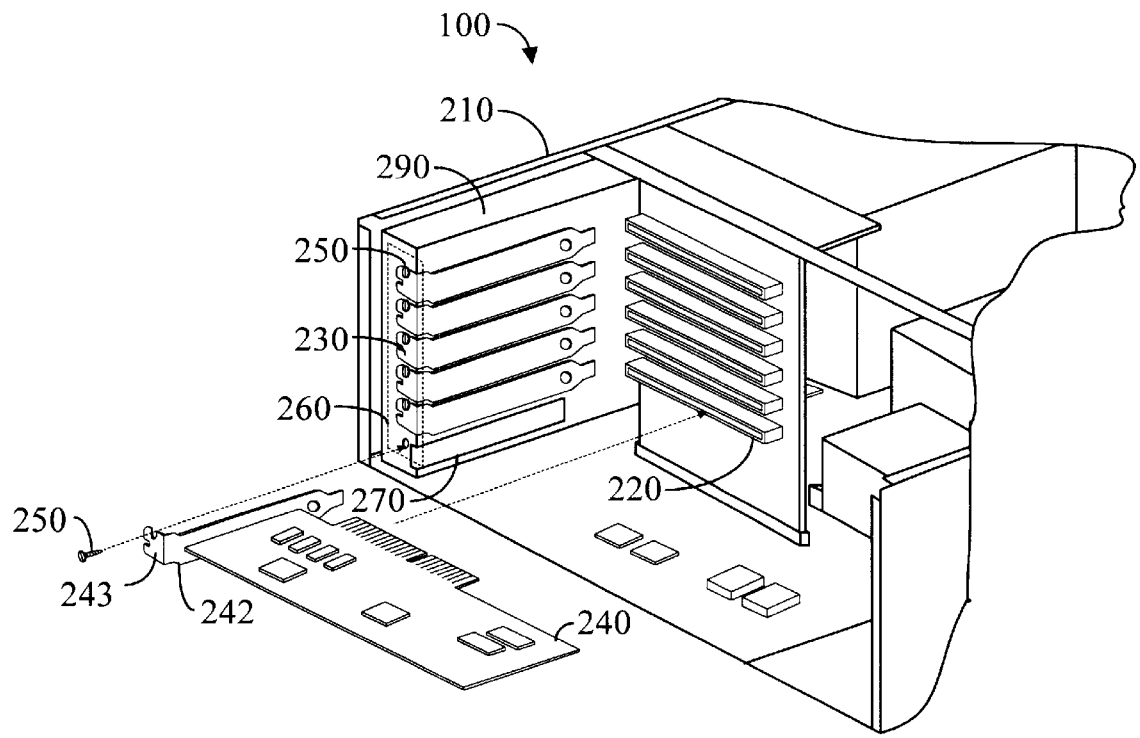
FIG. 2 is a cut-away perspective view of a generalized PCI card/slot interface located inside a computer chassis/frame.

Referring now to FIG. 2, an interior portion of a computer system 200, capable of receiving PCI cards, is shown. Computer system 200 includes: chassis/frame 210; PCI slots 220; PCI slot access covers 230; and one PCI card 240. PCI card 240 and PCI slot access covers 230 are securely held in place by fasteners 250.

As shown in FIG. 2, each PCI card 240 is attached to a PCI card mounting bracket 242 and PCI card 240 is installed into PCI slot 220. PCI card 240 and PCI slot access covers 230 are attached to a mounting location 290. Mounting location 290 has a series of pre-drilled holes to accommodate fasteners 250 and is typically an integral part of chassis/frame 210. Further, mounting location 290 provides a secure structure for attaching PCI card 240 and PCI slot access cover 230. Note that PCI card 240 and access cover 230 has a mounting face 243. Mounting faces 243 each have a hole or a slot which can accommodate a fastener 250.

PCI access ports 270 are openings in chassis/frame 210 which provide access to the various input/output connectors (not shown) which are typically located on PCI card mounting bracket 242. When PCI card 240 is installed in place, the input/output connectors are accessible from the exterior of computer system 100 through the openings created by access ports 270. This allows various communication and network cables to be connected to PCI card 240. Once connected to a network, MPEG or other similar multi-media data can be transmitted to computer 200 via the network. Thus, by placing the various components of the present invention described herein on a single PCI card 240, the pre-processing methods and apparatus described herein can be made readily available for almost any type of computer system available today.

A preferred embodiment of the present invention reduces the amount of processing time required by the receiver as it receives data. This is accomplish by introducing a reassembly mechanism that reduces the number of separate events surfaced for processing by the processor. Typically, data is surfaced on a frame by frame basis which causes a large number of interrupts to occur and, as a result, provides a significant amount of work for the processor related to interrupt processing in addition to the processing of the data. The reassembly mechanism of the present invention surfaces an entire buffer of data at one time rather than surfacing data on a frame by frame basis as has been done with existing systems. The data from each cell is entered into subsequent locations in a buffer, and as each frame is completed, it is verified by checking the length and CRC. Once a given frame is completed and marked good, then data from subsequent cells will be stored in subsequent locations beginning with an overlay of the previous frame trailer. All cells in a frame are entered into a buffer until the buffer is full or some other event occurs, at which time the buffer can be surfaced to the receiving system. Once the reassembly mechanism detects that cells should no longer be placed into a buffer, the reassembly mechanism surfaces the entire contents of the buffer into system memory. Other events which might trigger the surfacing of a buffer include the receipt of MPEG data splice points or the occurrence of an error. In addition to surfacing the data buffer, the reassembly mechanism could also be configured to surface relevant status indicators which provide information pertaining to the data contained in the data buffer. These status indicators could include a bad data indicator to notify the system that the data contained in the recently surfaced bumps indicating the time a cell was received, flags relating to congestion on the network, or other similar information that would be useful for system operation.

In the case of a non-standard transmission, such as premature termination due to an error condition or the existence of an end of stream condition, it is possible that the reassembly mechanism may surface a buffer which is empty or only partially full. In addition, as explained above, a status indicator message may also be surfaced to the system to indicate the error condition or an end of stream condition for the system.

While the above discussion has been directed towards MPEG data streams, the embodiments of the present invention are readily adaptable to other environments as well. For example, the Transmission Control Protocol/Internet Protocol (TCP/IP) standard defines a TCP header containing a field called the "urgent pointer." It the urgent pointer contains a non-zero value, this indicates that the data contained in the following transmission should be made available to the system as soon as possible after receipt at the destination. In this case, the reassembly mechanism described above could be extended and configured to surface any buffer whenever the urgent pointer contains a non-zero value.

Figure 4:
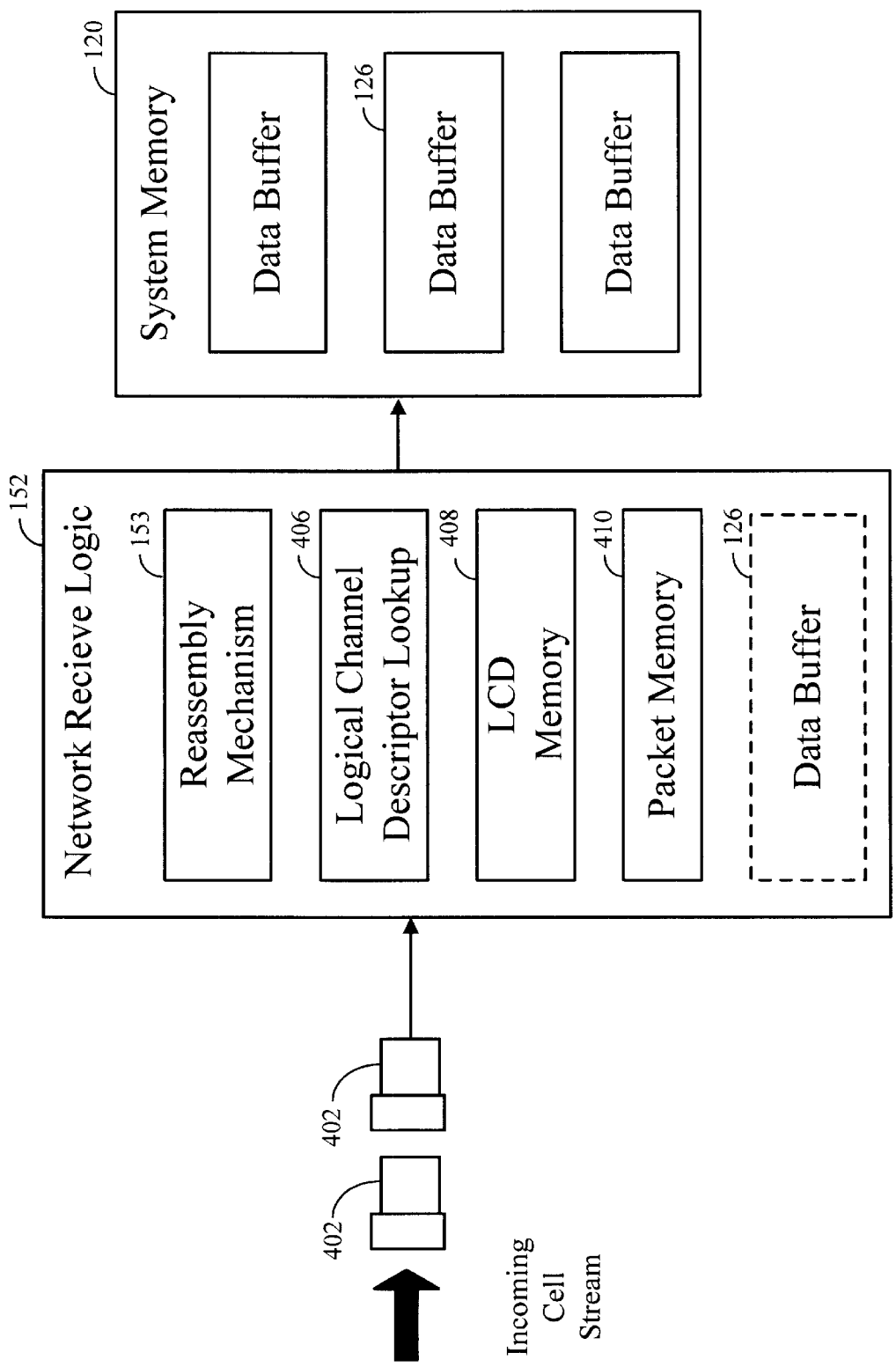
FIG. 4 is a block diagram of a reassembly mechanism in accordance with a preferred embodiment of the present invention.

Referring now to FIG. 4, the functionality of reassembly mechanism 153 is further illustrated. One or more ATM cells 402 travel through a cell switching network to network receive logic 152. Reassembly mechanism 153 processes incoming ATM cells and is included as a part of network receive logic 152, preferably within network interface 150 as illustrated in FIG. 1. Reassembly mechanism 153 reassembles cells received from the network into frames for surfacing to memory 120 shown in FIG. 1.

Reassembly mechanism 153 includes a Logical Channel Descriptor (LCD) lookup 406, an LCD memory 408, and a packet memory 410. Due to a process known as interleaving, cells from multiple multimedia data streams can arrive intermixed at the receiver. LCD lookup 406 allows reassembly mechanism 153 to categorize ATM cells into different virtual circuit streams, hence cells can be associated with their specific data stream. Each individual virtual circuit has an LCD memory block 408 uniquely associated with it. Information regarding an incoming stream will be stored in the LCD corresponding to that particular virtual circuit. Upon receipt of an ATM cell, reassembly mechanism 153 determines the corresponding LCD. Information stored in the LCD determines the storage location for the ATM cell data. Reassembly mechanism 153 extracts the data from the incoming ATM cells and stores the data into a data buffer 414. Data buffer 414 may be part of reassembly mechanism 153 or part of a designated portion of system memory 412.

Figure 5:
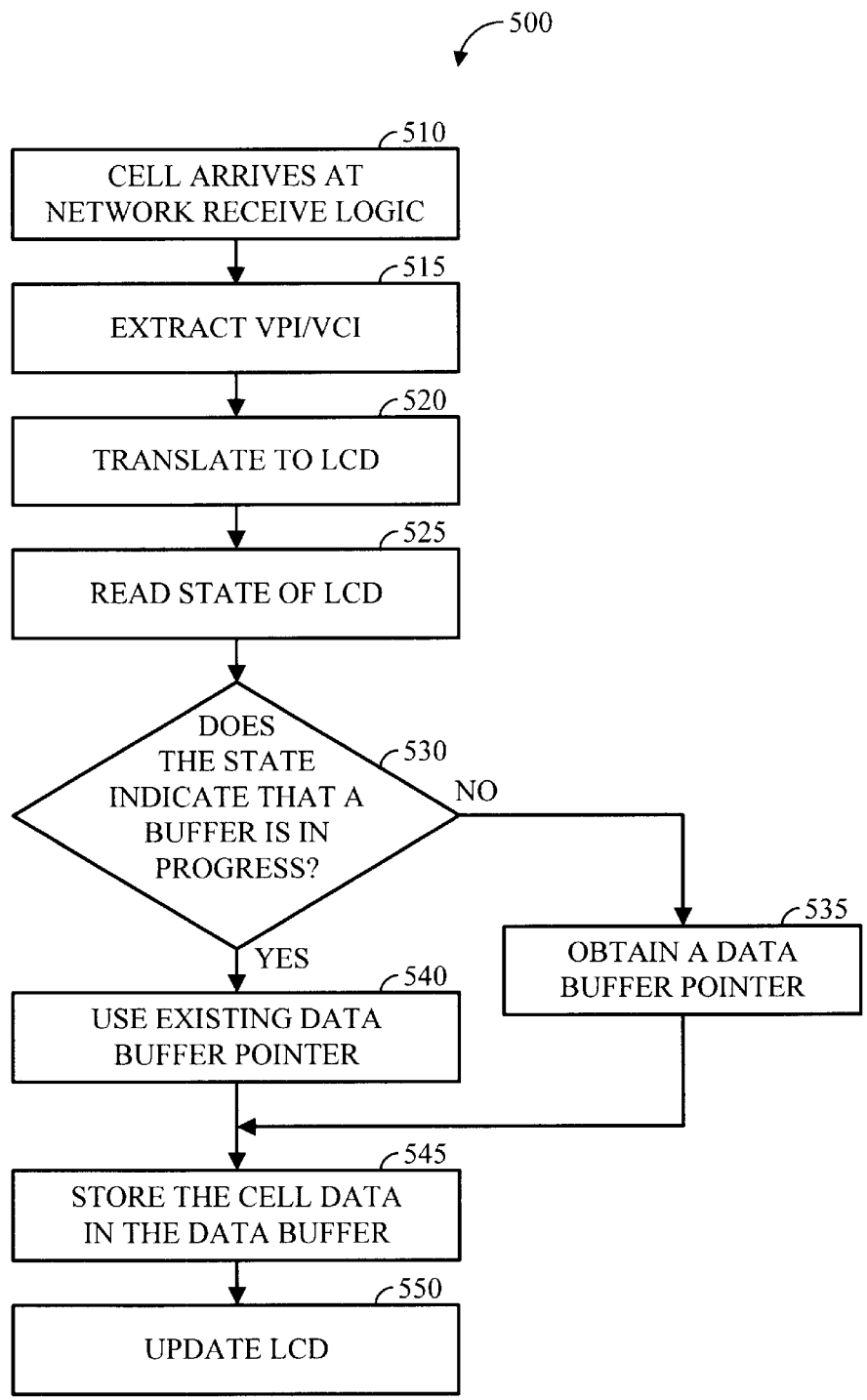
FIG. 5 is a flow diagram depicting a method for receiving a cell according to a preferred embodiment of the present invention.

Referring now to FIG. 5, a method 500 for receiving and processing multimedia data streams according to a preferred embodiment of the present invention is shown. Method 500 begins when a cell of data arrives at the reassembly mechanism (step 510). It can be assumed that the cell has been transmitted from a source over a cell switching network and that the reassembly mechanism resides on a receiver. Once the reassembly mechanism obtains the cell, the reassembly mechanism extracts a virtual path indicator (VPI) and the virtual circuit indicator (VCI) from the header portion of the cell (step 515). As mentioned above, a cell contains 53 bytes, 48 bytes of data and 5 bytes of header. The VPI/VCI indicates the virtual circuit that the cell took to reach the receiver. All cells in a given frame travel along the same virtual path to arrive at the receiver. However, the receiver may be receiving cells that have traveled along different VP/VC. The receiver must be able to distinguish between each of the interleaved cells to reassemble the cells into their proper frames. The VCI allows the receiver to distinguish between these different cells.

Multiple streams or virtual circuits may also be transmitted across the same virtual path, the VCI allows the receiver to distinguish between cells of data from different streams traveling across the same virtual path. It should be noted that this mechanism is described for the processing of cells from one VC. It is intended for this mechanism to be optimally used to simultaneously process cells from multiple VCs into distinct sets of buffers. It is also intended that different mechanisms and different parameters may be simultaneously used on different VCs with the described mechanism being one of many mechanisms.

Once the reassembly mechanism extracts the VPI/VCI from the header of the cell, the mechanism translates the values obtained therefrom into a logical channel descriptor (LCD) memory location (step 520). The LCD is a data structure that indicates when and where cell data is present in a buffer. There is an LCD for each multimedia data stream being processed by the receiver. When the reassembly mechanism extracts the VPI/VCI and translates the value to an LCD, this is for the purpose of locating the LCD that corresponds to the data stream for the cell just received in step 510. It should be noted that while the present invention may be used to process multiple streams concurrently, the system will still experience a benefit when processing a single stream. This is because the number of interrupts that are generated for the system processor will be reduced when compared to existing systems.

Once the reassembly mechanism determines the proper LCD (step 520), the mechanism reads the state of the LCD to determine whether a packet is in progress (step 525). When reading the state from the LCD, the mechanism retrieves the data buffer pointer, the current data offset, the current CRC 32 value, and the buffer threshold. The maximum data buffer length can be stored directly in the LCD; alternatively, it may also be specified as a global variable. The length of the data buffer could be set up locally (in the LCD) in order to set different lengths and different types of information for different channels. A buffer is considered in progress when a data buffer has been designated to receive cells from a particular data stream. If the reassembly mechanism determines that a buffer is not in progress for a given data stream (step 530=NO), the mechanism obtains a data buffer pointer (step 535) which references an empty data buffer where cells may be stored. Conversely, if the reassembly mechanism determines that a buffer is already in progress for a given data stream (step 530=YES), the reassembly mechanism uses the existing data buffer pointer (step 540) which references a data buffer where some previously received cell data for that data stream has already been stored. Once the reassembly mechanism has obtained a pointer to the appropriate buffer, the mechanism stores the cell data into the buffer at the current offset as indicated in the LCD (step 545). The LCD is then updated in preparation for receiving the next cell (step 550).

Figure 6:
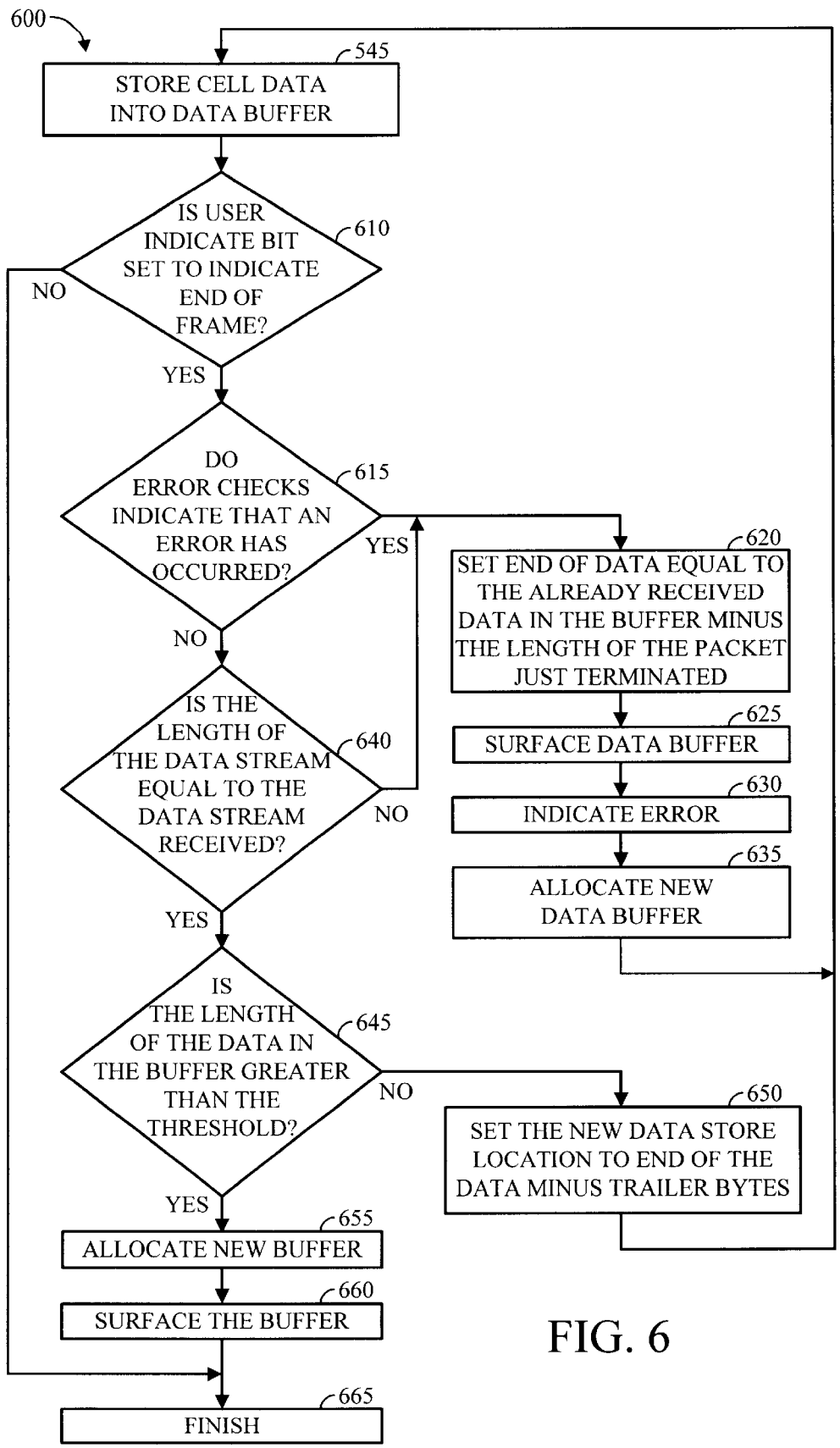
FIG. 6 is a flow diagram depicting a method for processing data buffers according to a preferred embodiment of the present invention.

Referring now to FIG. 6, a method 600 for surfacing data in accordance with a preferred embodiment of the present invention begins when the reassembly mechanism stores the cell data into the buffer (see FIG. 5, step 545). The reassembly mechanism then determines whether the user indicator (UI) bit is set (step 610). When the UI bit is set (step 610=YES), this indicates that the cell just stored in the data buffer (in step 545) is the last cell in the AAL-5 frame.

Once the reassembly mechanism determines that a cell is the last cell in a frame (step 610=YES), the reassembly mechanism then determines whether the receive data stream is valid. The mechanism first performs various error-checking steps to test the validity of the received data. These checks include verifying that the received CRC-32 matches the calculated CRC-32, and other similar AAL 5 validation checks (step 615). If an error has occurred, this will indicate that the data has not been properly received. When the reassembly mechanism determines that an error has occurred (step 615=YES), the mechanism sets the end of data equal to the data in the buffer minus the length recorded in the LCD of the packet just terminated.

As mentioned, data from several consecutive frames can be stored in one data buffer. When the reassembly mechanism detects that an error has occurred when receiving the last frame, the mechanism still surfaces the good frame data into main memory. The reassembly mechanism deletes the bad data from the data buffer by setting the end of data equal to the data in the buffer minus the length recorded in the LCD of the packet just terminated (step 620). When the reassembly mechanism surfaces the data into main memory (step 625), only the data up until the end of data qualified or verified will be surfaced. Thus, when the reassembly mechanism sets the end of data equal to the already received data minus the length of the packet just received (step 620), the mechanism is surfacing the good data to main memory (step 625). Once the reassembly mechanism surfaces the good data, the mechanism makes an indication to the CPU that an error has occurred in receiving a data packet (step 630). Similar mechanisms for surfacing good data and indicating the rejection of bad data must be used. As previously stated, any of a number of mechanisms known in the art or newly developed may be used. An example is an interrupt bit in combination with a status register. Once the mechanism indicates that an error has been made, the reassembly mechanism allocates a new data buffer where new cells will be stored (step 635).

If the reassembly mechanism determines that no CRC errors or other similar transmission errors have occurred (step 615=YES), the reassembly mechanism then determines whether the length of the data stream sent by the source is equal to the length of the data stream received (step 640). It should be understood that when the mechanism reaches step 640, the mechanism has already determined that the cell is the last cell in a stream and that no errors have occurred in transmission.

As previously mentioned, data from several subsequent AAL-5 frames can be stored in one data buffer. When the reassembly mechanism detects that the length of the data stream sent by the source is not equal to the length of the data stream received, the mechanism still surfaces the previously received good frame data into main memory. The reassembly mechanism deletes the bad data from the data buffer by setting the end of data equal to the data in the buffer minus the length of the packet just received (step 620). When the reassembly mechanism surfaces the data into main memory (step 625), only the data up until the end of the verified data will be surfaced. Typically, when the reassembly mechanism sets the end of data equal to the already received data minus the length of the packet just received (step 620), the mechanism is surfacing the good data to main memory (step 625). Once the reassembly mechanism surfaces the good data, the mechanism makes an indication to the CPU that an error has occurred in receiving a data packet (step 630). Once the mechanism indicates that an error has been made, the reassembly mechanism allocates a new data buffer where new cells will be stored (step 635). Alternatively, the reassembly mechanism could be configured to surface other types of indicators relative to the nature of the received data. This might include timestamps to indicate the arrival times of various cells, network congestion flags, etc. In addition, the reassembly mechanism could be configured to surface all received data, including the bad data and also surface related status indicators to indicate which part of the received data is invalid. These additional status indicators can be useful for troubleshooting network connections and locating the source of transmission errors.

If the reassembly mechanism determines that the length of the data stream is equal to the data stream received (step 640=YES), the mechanism determines whether the length of the data already in the data buffer is greater than the threshold. The preprocessing checks the amount of data in the buffer (step 645) in order to ensure that overflow will not occur when a cell is stored into the data buffer by the reassembly mechanism when received (step 545 in FIG. 5).

If the reassembly mechanism determines that the length of data in the buffer is less than the threshold (step 645=NO), the reassembly mechanism sets the new data store location at the end of the data in the buffer minus eight (step 650). As mentioned, when a data stream is transmitted, the last eight bytes of the transmission are filled with trailer information. The trailer includes information indicating that the cell is the last byte in a data stream and also includes information regarding the quality of the transmission. If the reassembly mechanism detects that the last cell has been received and that more data will fit into the buffer, the mechanism sets the new data store location in the buffer so that new data will be copied into the buffer over the trailer data already stored in the buffer. This is accomplished by reading the current location of the data store and setting the new location of the data store back eight bytes. By copying new cell data over the trailer information in the buffer, the reassembly mechanism allows an entire buffer to be surfaced instead of surfacing each packet, frame or cell. Alternately, if the data is other than MPEG, or if the data length is not (n * 48)–8, the trailer and padding bytes can be overwritten by the next piece of incoming data. This provides for variable sized data packets to be packed into a receive data buffer without padding.

With a 155 Mbps network connection, the reassembly mechanism reduces the number of interrupts required for processing n=2 byte AAL-5 frames from 50,000 interrupts per second to 1162 interrupts per second when using 16K data buffers. Using a 64K data buffer further reduces the number of interrupts per second to 287 interrupts per second. Further, use of the reassembly mechanism results in better bus performance since large blocks of data are loaded into system memory at one time rather than small bursts, each of which require arbitration, cache, and buffer management overhead.

After the reassembly mechanism sets the new data store location at the end of data minus the trailer bytes (step 650), the mechanism continues and copies the next cell into the data buffer. Steps 610 through 650 will be repeated as long as no errors occur in receiving the data stream and the data buffer is not full and the threshold is not exceeded and external mechanism does not trigger closure.

Conversely, if the reassembly mechanism determines that the length of the data in the buffer is greater than the threshold (step 645=YES), the mechanism allocates a new buffer (step 655) and surfaces the current buffer (step 660). When the reassembly mechanism determines that the length of the data in the buffer is greater than the threshold (step 645=YES), this indicates that a new data cell will not fit into the buffer currently in use. In order to store more data, the reassembly mechanism allocates a new data buffer where the data from the next cell received will be stored. Since the current buffer is no longer in use, the reassembly mechanism surfaces the current buffer.

Figure 7:
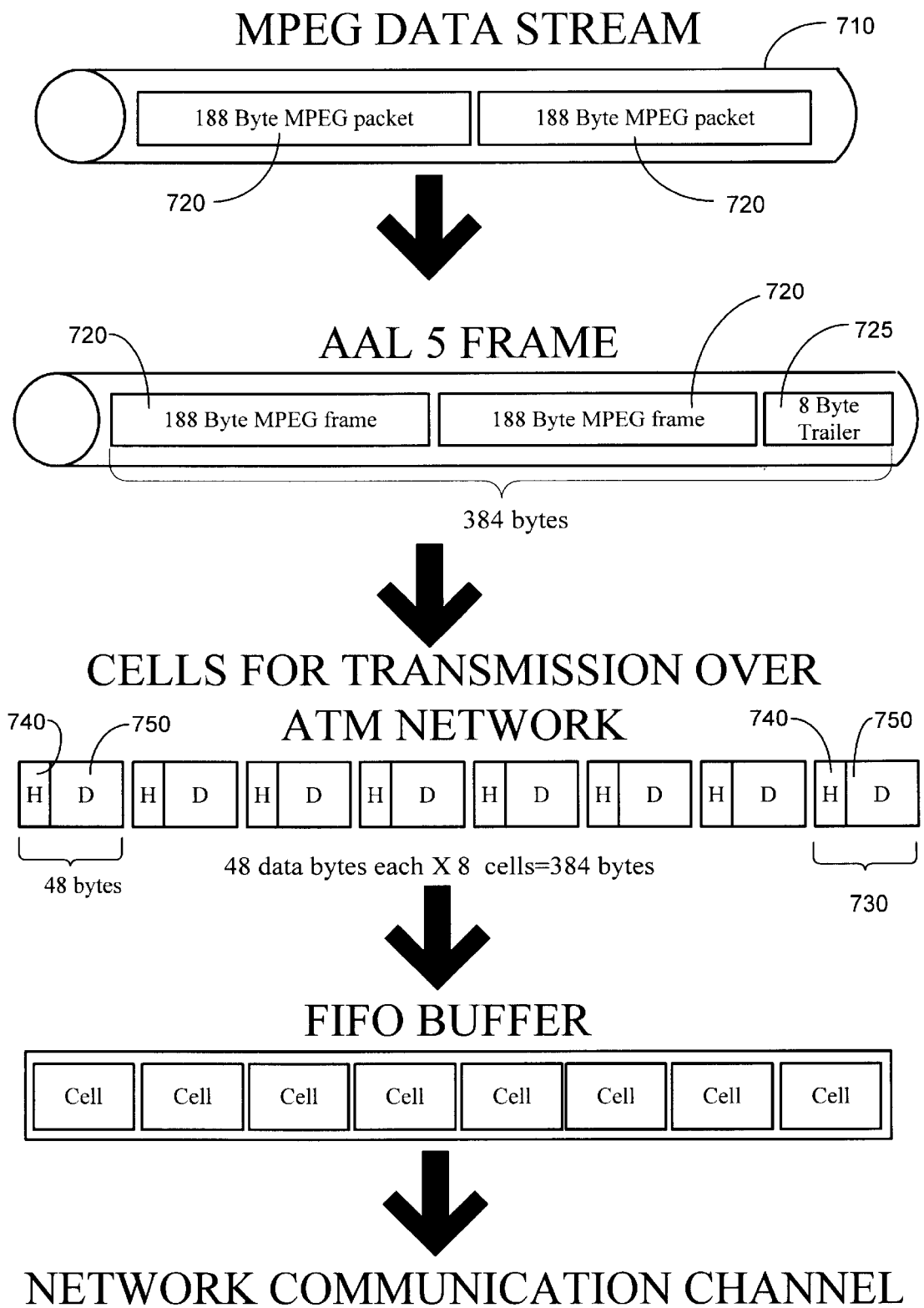
FIG. 7 depicts the changes in a frame as it is sent across a network and received into system memory.

Referring now to FIG. 7, an MPEG data stream 710 is shown in various forms to depict the transmission of MPEG data using reassembly mechanism 153 described above. MPEG data stream 710 in its original form before transmission is made up of fixed size, 188 byte packets 720. In order to transmit MPEG data stream 710 over an ATM network, two 188 byte MPEG packets 720 are placed into an AAL-5 frame along with an 8 byte trailer 725. The placement of the two packets 720 and the trailer 725 into the AAL-5 frame results in an AAL-5 frame having 384 bytes.

The AAL-5 frame must then be broken up into a plurality of ATM cells 730 for transmission over a cell switching network. Each ATM cell contains 53 bytes with 48 bytes of data 740 and 5 bytes of header 730. The 384 bytes of data contained within the AAL-5 frame can evenly be broken up into 8 cells of 48 bytes each. The last ATM cell (the $8^{th}$) contains the trailer information from the AAL-5 frame. A user indicate bit is located within the 5 byte header 740 of the last cell that designates the cell as the last cell in the frame.

ATM cells 730 are then transmitted over an ATM network and received by reassembly mechanism 153. Reassembly mechanism 153 works with AAL 5 processing layer to reassemble received cells 730 into MPEG frames 720. Reassembly mechanism 153 checks the user indicate bit in each cell as the cell arrives. When the user indicate bit is set, the reassembly mechanism recognizes the cell as the last cell in the frame. As described above, reassembly mechanism 153 strips away header 740 from each cell 730 before inserting cell 730 into data buffer 126. Once all cells 730 have been inserted into data buffer 126, network receive logic mechanism 152 can burst the contents of data buffer 126 into system memory 120.

Figure 8:
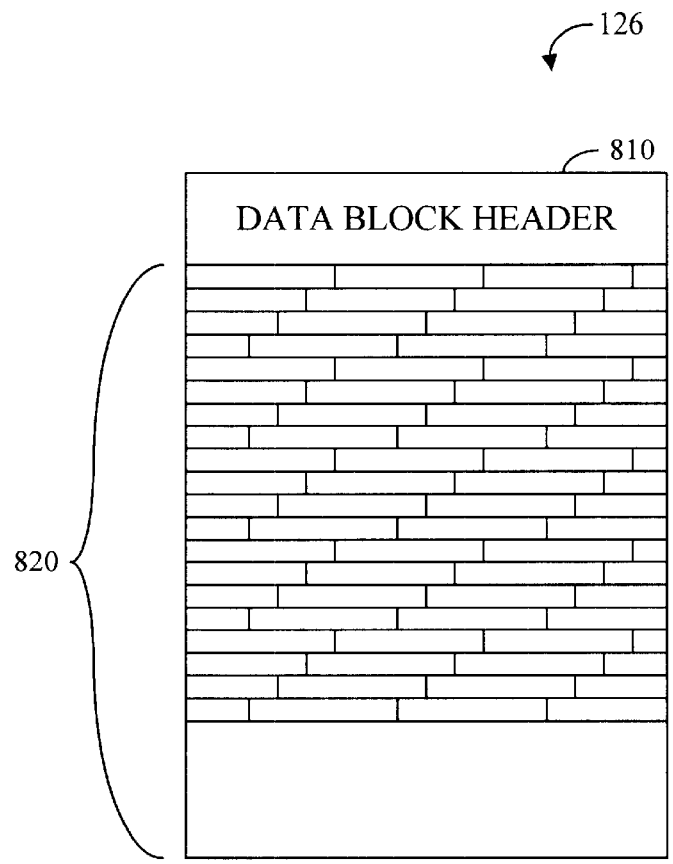
FIG. 8 is a block diagram of the received and reassembled data block using a method according to a preferred embodiment of the present invention.

Referring now to FIG. 8, a data buffer 126 includes a data block header 810 and a data portion 820. Data block header 810 includes various identifiers which are used to describe the state of buffer 126. The identifiers include information regarding whether or not buffer 126 is in use, empty, data offsets, data length, and other optional information. Data portion 820 includes the data collected from multiple verified AAL-5 frames, after the incoming cells have been processed by assembly mechanism 153 of FIG. 1. The data contained in data portion may include multiple ATM cells, data blocks or multiple MPEG-2 transport stream packets. Data buffer 126 may be terminated and surfaced to system 100 by the occurrence of any number of conditions. As explained above, these conditions might include, for example, a buffer full condition, a crossed threshold, a frame error, program stream content indicator such as an MPEG splice point or other data analysis indicator.

Figure 9:
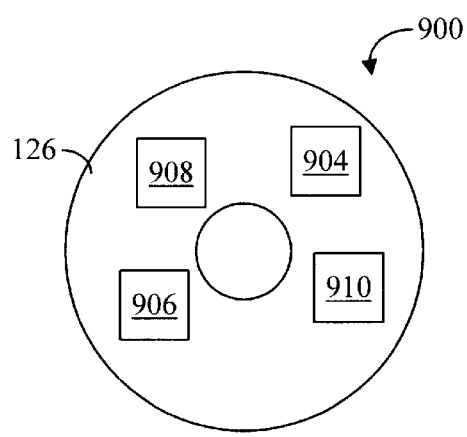
FIG. 9 is a block diagram illustrating a computer program product in accordance with a preferred embodiment of the present invention.

Referring now to FIG. 9, a program product 900 is illustrated. Program product 900 includes a magnetic disk 902 and a plurality of software programs 904, 906, 908, and 910 which are stored on magnetic disk 902. The functionality of reassembly mechanism 153 may be incorporated into one or more of software programs 904, 906, 908, and 910. As explained previously, the present invention may be distributed using a variety of signal bearing media to actually carry out the distribution. Examples of signal bearing media include recordable type media such as magnetic disk 920.

Although the above-presented examples have demonstrated the use of reassembly mechanism 153 to surface a data buffer 126 once the buffer has been filled, there are many other events that can be used to determine the time to surface the a buffer and either close the connection or allocate a new data buffer. The error scenarios described above provide examples of triggering events for surfacing a data buffer or switching data buffers.

As an alternative preferred embodiment, the presence of an MPEG splice point or other data stream content indicator may be used to generate a signal for the destination computer system. This embodiment may be implemented by using a separate state machine which scans the MPEG data stream. The state machine may be used to indicate the end of a given program section with a splice point countdown and splice point indicator. A useful addition to the known art is to terminate the transfer of data into the data buffer at an MPEG splice point and surface the splice point received event, which is analogous to data received with the addition of the splice point indicator.

As is known to those skilled in the art, MPEG-2 multimedia data streams contain information which allows the beginning of one section of data to be spliced onto the end of another section of data in a way that the spliced information is preserved. This mechanism may be used, for example, when the scene changes in a video or at the end of network program content and the beginning of a commercial. Multimedia splicing equipment, multimedia entertainment equipment, multimedia analysis equipment, and network monitors, among other applications, may advantageously make use of the data reassembly and block collection techniques described herein, and may extend this utility with the addition of the ability to terminate a block at the end of a multimedia section indicated in the case of MPEG-2 by the countdown indicator's place in a data stream.

Referring now to FIGS. 10 and 11, the transmission of data packets using the transport stream packet layer of the MPEG-2 standard is further described. The protocol used at this layer is the transport packet. The transport packet includes a plurality of predetermined formatted fields which operate to control the flow of the data during the transmission process. The full definition of these various formatted fields is contained in the ITU-T recommendation H.222.0-ISO/IEC 13818-1 (1995) Generic Coding of Moving Pictures and Associated Audio Information: Systems, International Organization for Standardization, Organization Internationale de Normalisation (ISO/IEC JTC1/SC29/WG11).

Some of the transport packet fields include: a program identifier (PID) field which identifies the data stream stored in the packet payload; a continuity counter field which is incremented in each successive transport stream packet with the same PID and wraps to 0 after reaching its maximum value, etc. It should be noted that the continuity counter is not implemented with predefined values of the adaptation field control. The adaptation field control indicates whether this transport stream packet header is followed by an adaptation field and/or payload. The continuity counter in a particular transport stream packet is continuous when it differs by one increment from the continuity counter value in the previous transport stream packet of the same PID.

Referring now to FIG. 10, a data structure description 1000 for an MPEG-2 transport packet is presented. A typical transport packet begins with a synchronization byte and, as shown in FIG. 10, includes an adaptation_field_control portion. If the adaptation field control is equal to either 10 or 11, then an adaptation field, such as the one illustrated in FIG. 11, has been included as a part of the transport packet. The adaptation field contains components which may be included in the transport packet.

Referring now to FIG. 11, the physical structure of adaptation field 1100 is illustrated. As shown in FIG. 11, adaptation field 110 includes a series of additional flags or indicators which provide certain information about the transport packet. These fields may include, for example, a discontinuity indicator for tracking anomalies in the data stream. Another field which may be included is the Program Clock reference field which indicates the relative playback time appropriate for this packet. Program IDs (PIDs) which contain PCRs are termed "PCR PIDs." A continuity counter discontinuity is indicated by the use of that discontinuity indicator in any transport stream of packet. When the discontinuity state is "true" in any transport stream packet of a particular PID, the continuity counter in that packet may be discontinuous with respect to the previous transport stream packet of the same PID.

When the discontinuity state in the transport stream packet of the PCR PID is true, the continuity counter may only be discontinuous in the packet in which a system time base discontinuity occurs. A continuity counter discontinuity point occurs when this continuity state is true in the transport stream packet and/or the continuity counter in the same packet is discontinuous with respect to the previous transport stream packet of the same PID. A splice point flag field is a one bit flag where a value of one indicates that a splice countdown field is present in the associated adaptation field, specifying the current or future occurrence of a splicing point. A value of 0 for the splice point flag indicates that a splice countdown field is not present.

The splice countdown field is an eight bit field representing a value which may be positive or negative. A positive value specifies the remaining number of transport stream packets, of the same PID, following the associated transport stream packet until a splicing point is reached. Duplicate transports stream packets and transport stream packets which contain only adaptation fields are excluded from this count. The splicing point occurs immediately after the transfer of the transport stream packet in which the splice counter reaches the value 0. In the transport stream packet where the splice countdown reaches 0, the last byte of the transport stream packet payload shall be the last byte of the code of audio frame or a coded picture. It is at this point, the splice point, as described above, that it is appropriate for the block reassembly of a block of stream data to be terminated and the data buffer containing the data block to be surfaced to the system. The presence of a splice point does not require an error message but it would be preferred to surface the data buffer with a special indication that the termination of the current data buffer is due to the presence of a splice point.

This is only one specific example of using the MPEG-2 Transport stream splice point to terminate reassembly and surface a buffer containing MPEG data. As such, this method provides an example of the general technique of using program content to terminate the reassembly of cell data into a data block. This examples illustrates that a data block may be surfaced on conditions other than the occurrence of an error or filling a data buffer. Once presented with this example, those skilled in the art will understand the broader application of using the content of the data stream to advantageously terminate and surface a data block.

Figure 12:
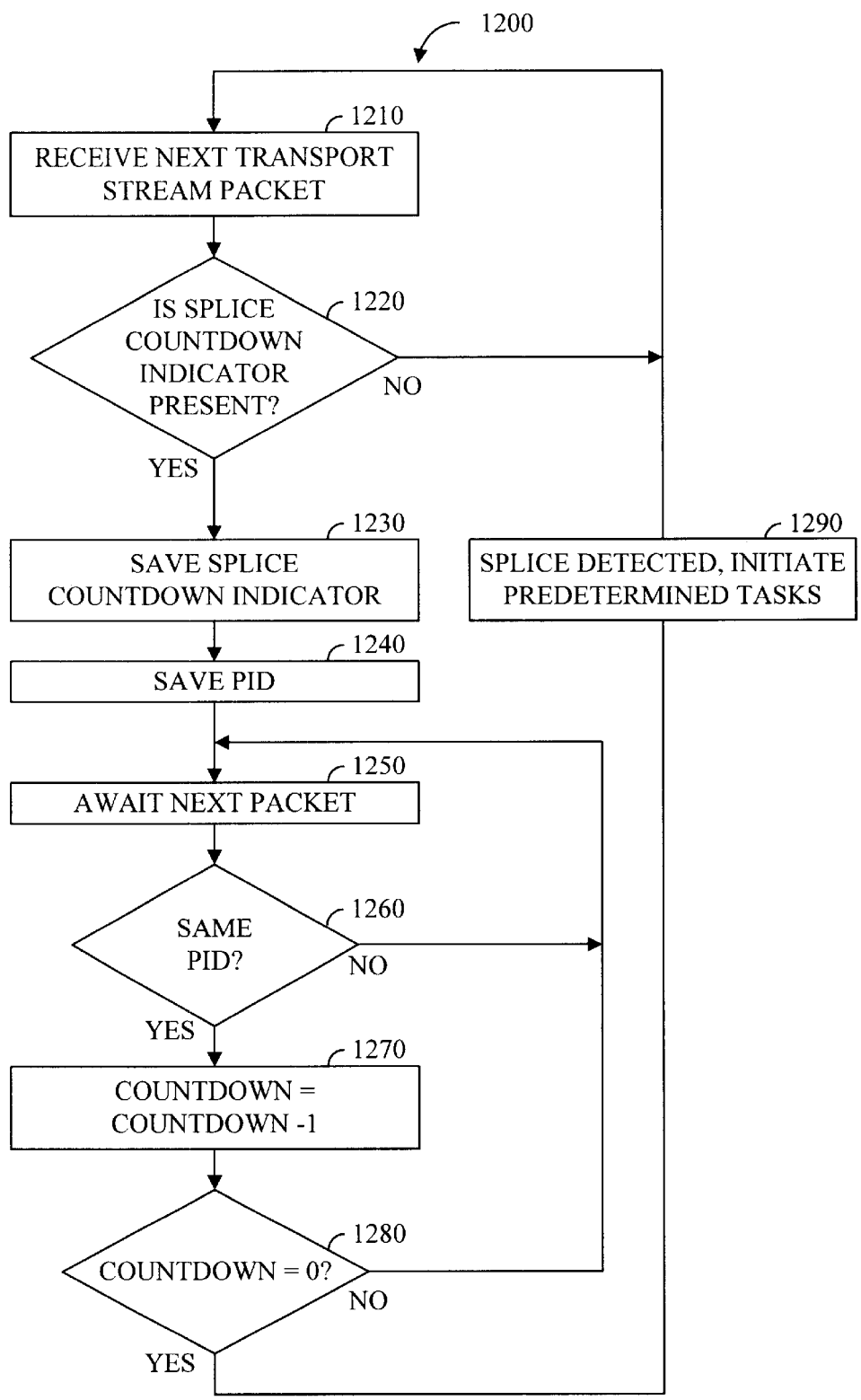
FIG. 12 depicts a method for detecting splice points in an MPEG-2 data stream according to a preferred embodiment of the present invention.
Figure 13:
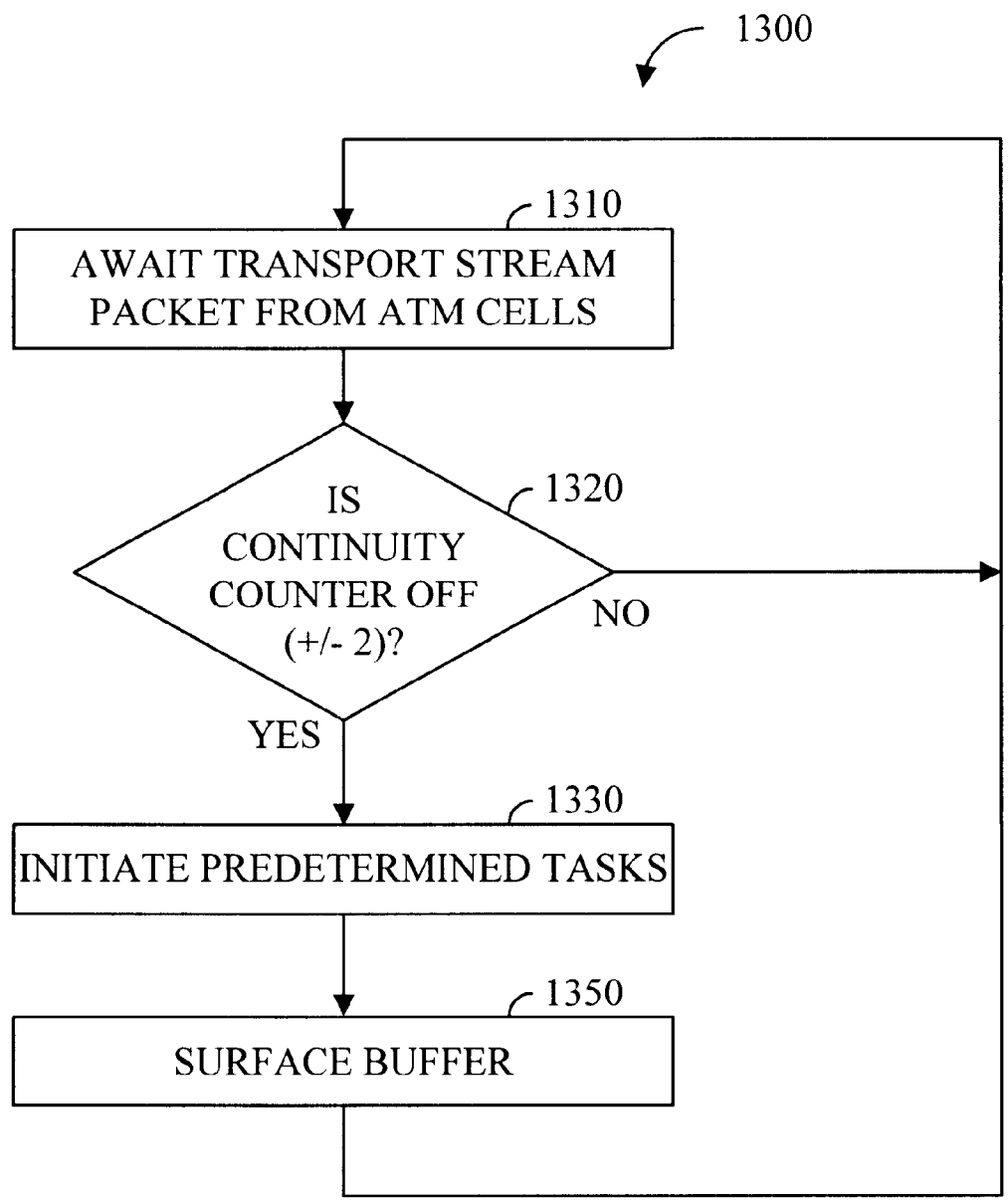
FIG. 13 depicts a method for detecting splice points in an MPEG-2 data stream according to an alternative preferred embodiment of the present invention.

Referring now to FIGS. 12 and 13, exemplary logical steps for alternative embodiments suitable for detecting a splice point according to the preferred embodiments of the present invention are presented. Referring initially to FIG. 12, a method 1200 for detecting an MPEG splice point is illustrated. The sequential steps of method 1200 begin with the obtaining of a next sequential transport stream packet from the data stream (step 1210). The next transport stream packet is subsequently examined to determine whether or not a splice countdown indicator is present in the transport stream packet just received (step 1220). As mentioned above, the adaptation_field_control portion of the transport packet can be used for this purpose. If a splice countdown indicator is present (step 1220=YES), the splice countdown value is saved (step 1230) and the PID is also saved (step 1240). Otherwise, if a splice countdown indicator is not present, (step 1220=NO) then the sequential operation will await the arrival of the next transport stream packet in the data stream (step 1210) and continue in this fashion until a splice countdown indicator is presented in the data stream.

After saving the splice countdown and the PID, the next transport stream packet is awaited (step 1250). Once the next transport stream packet is received, the PID of this transport stream packet received is compared to the PID saved as a result of step 1240. If the PID is not the same (step 1260=NO), then the packets are not related and sequential operation of method 1200 returns to step 1250 to await the next transport stream packet. Otherwise if the PID is the same as the PID for the packet received in step 1210 (step 1260=YES), then the countdown value is decreased by one (step 1270) and the resulting countdown value is compared with 0 (step 1280). If the countdown value is equal to 0 (step 1280=YES), then a splice is detected and predetermined tasks will be initiated (step 1290). These predetermined tasks can be any suitable activity but could include surfacing the present data buffer and the splice point indicator to the system. Otherwise if the countdown value does not equal 0 (step 1280=NO), the sequential operation of method 1200 returns to step 1250 to await the next transport stream packet.

Referring now to FIG. 13, a method 1300 for detecting splice points according to a preferred embodiment of the present invention is illustrated. Method begin awaiting a transport stream packet from ATM cells (step 1310). When the ATM cell transport stream packet has been received, the continuity counter is checked to see if it differs by more than two from the previous transport stream packet continuity counter by +/−2 (step 1320). If so (step 1320=YES), a splice is detected and the predefined tasks are initiated (step 1330). These predefined tasks may include, for example, deleting or ignoring this splice frame to stop recording; inserting a local commercial in the spliced stream section, buffering the main stream until a local commercial is finished, or surfacing the current data buffer (step 1250). Otherwise, if the continuity counter does not differ by more than two from the previous transport stream packet continuity counter (step 1320=NO), then the sequential operation returns to step 1310 to await the next transport stream packet from ATM cells.

As described above, a preferred embodiment of the present invention reduces the amount of system-level processing time required for processing stream or block data. The preferred embodiments of the present invention accomplishes this by introducing a reassembly mechanism that reduces the number of surfacing events performed by the processor. Typically, in existing systems, data is surfaced on a frame-by-frame basis. This approach causes a large number of interrupts to occur and, as a result, causes the processor to use its finite resources to process interrupts rather than data. In contrast, the present invention uses a reassembly mechanism to surface an entire buffer of data at one time rather than surfacing data on a cell by cell, or frame by frame basis. All cell data in a series of frames are entered into a buffer until the buffer is full or some other error occurs. Once the reassembly mechanism detects that cells should no longer be placed into a buffer, the reassembly mechanism surfaces the entire contents of the buffer into system memory.

The invention has been particularly shown and described with reference to processing fixed size MPEG packets. However, it should be understood by those skilled in the art that the methods of the present invention are applicable to processing all types of data streams carried over frame-based networks and, therefore, variable sized packets and frames may be processed by the described mechanism and that various changes in form and details may be made therein without departing from the spirit and scope of the invention.

What is claimed is:

1. An apparatus comprising:
   a processor;
   a memory coupled to the processor;
   means for receiving cells of transmitted frames from a network to which said apparatus is connected;
   means for storing said cells in a data buffer;
   means for monitoring for an end of frame signal;
   means for determining whether an error has occurred within the plurality of cells when an end of frame signal is received;
   means for comparing the length of data in the data buffer with a threshold if an end of frame signal has not been received and an error has not occurred;
   means for allocating a new buffer if the length of the data in the buffer is greater than the threshold;
   means for setting the new data store location at the end of the data if the length of the data in the buffer is not greater than the threshold;
   means, when an error is identified with a received cell, for:
      setting the end of the data in the data buffer equal to the already received data in the buffer minus the length of the cells of the frame within which the error is identified;
      surfacing the data buffer;
      indicating an error; and
      allocating a new data buffer;
   a reassembly mechanism that reassembles a plurality of received cells into a plurality of frames; and
   means for surfacing more than one of the plurality of frames from the buffer at a time to the processor.

2. The apparatus of claim 1 wherein the reassembly mechanism further comprises at least one buffer having a length of at least two frames, the means for resurfacing periodically surfacing the contents of the at least one buffer to the processor.

3. The apparatus of claim 1 wherein the plurality of cells are asynchronous transfer mode cells transmitted via an asynchronous transfer mode network.

4. The apparatus of claim 1 further comprising means for notifying the processor when the more than one of the plurality of frames of data is surfaced at a time.

5. The apparatus of claim 2 wherein the length of the at least one buffer is the length of a plurality of frames.

6. The apparatus of claim 2 wherein each of the plurality of frames comprises at least one cell, the reassembly mechanism placing the at least one cell into the at least one buffer when the at least one cell has been received.

7. The apparatus of claim 2 wherein said means for surfacing surfaces the at least one buffer when the at least one buffer is full, and wherein the reassembly mechanism allocates at least one new buffer when the at least one buffer is surfaced.

8. The apparatus of claim 1 wherein the reassembly mechanism checks each frame of the plurality of frames of data to see if an error has occurred.

9. The apparatus of claim 8 wherein the reassembly mechanism indicates an error to the processor when an error has occurred.

10. The apparatus of claim 9 wherein the reassembly mechanism automatically surfaces the plurality of frames of data when an error has occurred.

11. The apparatus of claim 1 wherein each frame of the plurality of frames contains information from one of a plurality of different streams, the reassembly mechanism further comprising a plurality of buffers, each of the plurality of buffers being uniquely assigned to one of the plurality of different streams, the means for receiving including means for selectively placing each of the plurality of cells into one of the plurality of buffers that has been uniquely assigned to a particular one of the plurality of different streams from which each of the plurality of cells came.

12. The apparatus of claim 1 wherein the means for surfacing transfers the contents of the at least one buffer to the memory by performing a direct memory access.

13. The apparatus of claim 1 wherein at least one of the plurality of cells contains a data stream content indicator and the means for surfacing surfaces the at least one buffer upon receipt of the data stream content indicator.

14. The apparatus of claim 13 wherein the data stream content indicator comprises an MPEG splice point.

15. The apparatus of claim 13 wherein the data stream content indicator comprises a discontinuity indicator.

16. An apparatus comprising:
   a processor;
   a memory coupled to the processor; and
   a reassembly mechanism residing in the memory and being executed by the processor, the reassembly mechanism comprising:
      at least one buffer having a length of at least two frames;
      means for receiving a plurality of asynchronous transfer mode cells and placing the plurality of asynchronous transfer mode cells into the at least one buffer;
      means for checking each received frame of said plurality of frames for an occurrence of an error;
      means, responsive to a determination that an error has occurred in a received frame, for:
         setting the end of the data in the data buffer equal to the already received data in the buffer minus the length of the cells of the frame within which the error occurred;
         surfacing the data buffer, wherein all previous frames in said at least one buffer are immediately surfaced and the received frame causing said error is not surfaced;
         indicating an error; and
         allocating a new data buffer; and
      means for otherwise surfacing the at least one buffer only when said at least one buffer contains at least two frames.

17. The apparatus of claim 16 wherein each cell of the plurality of cells is from one of a plurality of different streams, the reassembly mechanism further comprising a plurality of buffers, each of the plurality of buffers being uniquely assigned to one of the plurality of different streams, the reassembly mechanism selectively placing each of the plurality of cells into one of the plurality of buffers that has been uniquely assigned to that one of a plurality of different streams from which each of the plurality of cells came.

18. The apparatus of claim 16 wherein the length of the at least one buffer is the length of a plurality of frames.

19. The apparatus of claim 16 wherein the reassembly mechanism indicates an error to the processor if an error has occurred.

20. The apparatus of claim 16 wherein the reassembly mechanism surfaces the plurality of frames of data if an error has occurred.

21. The apparatus of claim 16 wherein the reassembly mechanism surfaces the at least one buffer when the at least one buffer is full, and automatically allocates at least one new buffer while surfacing the at least one buffer.

22. The apparatus of claim 16 wherein the reassembly mechanism transfers the contents of the at least one buffer to the memory by performing a direct memory access.

23. The apparatus of claim 16 wherein at least one of the plurality of cells contains a data stream content indicator and the reassembly mechanism surfaces the at least one buffer upon receipt of the data stream content indicator.

24. The apparatus of claim 23 wherein the data stream content indicator comprises an MPEG splice point.

25. An apparatus comprising:
a processor coupled to a network and receiving a plurality of frames of data from the network, each frame of the plurality of frames of data being from one of a plurality of different streams;
a memory coupled to the processor; and
a reassembly mechanism residing in the memory and being executed by the processor, the reassembly mechanism comprising a plurality of buffers, each of the plurality of buffers being uniquely assigned to one of the plurality of different streams, the reassembly mechanism placing each frame into the buffer that has been uniquely assigned to a particular one of the plurality of different streams from which the frame came, each of the plurality of buffers having a length of at least two frames, said reassembly mechanism including:
means for receiving said plurality of cells;
means for storing data from each received cell into a data buffer;
means for checking whether an end of frame has occurred;
means for comparing the length of the data with a threshold if an end of frame has not occurred;
means for setting a new data store location at the end of the data if the length of the data in the buffer is less than the threshold;
means for allocating a new buffer if the length of the data in the buffer is greater than the threshold;
means, when an error is identified with a received cell, for:
setting the end of the data in the data buffer equal to the already received data in the buffer minus the length of the cells of the frame within which error is identified;
surfacing the data buffer;
indicating an error; and
allocating a new data buffer; and
means for periodically surfacing each buffer of the plurality of buffers to the processor, wherein a plurality of frames of a particular one of said plurality of different streams is surface at the same time.

26. The apparatus of claim 25 wherein the reassembly mechanism notifies the processor when each buffer of the plurality of buffers is surfaced.

27. The apparatus of claim 25 wherein the reassembly mechanism checks each frame to see if an error has occurred.

28. The apparatus of claim 27 wherein the reassembly mechanism surfaces the buffer that has been uniquely assigned to a particular one of a plurality of different streams from which the frame with the error came.

29. The apparatus of claim 27 wherein the frame with the error is not surfaced.

30. The apparatus of claim 25 wherein the reassembly mechanism surfaces at least one of the plurality of buffers when the at least one of the plurality of buffers is full, and wherein the reassembly mechanism allocates a new buffer, the new buffer being uniquely assigned to the one of the plurality of different streams to which the surfaced buffer was assigned.

31. A method for receiving data from a network, the method comprising the steps of:
receiving cells containing data of a plurality of transmitted frames;
associating a logical channel descriptor with the each cell, by:
extracting a virtual path indicator and virtual circuit indicator from a received cell; and
translating the virtual path indicator and virtual circuit indicator into the logical channel descriptor;
storing each cell in a buffer that uniquely corresponds to the logical channel descriptor;
updating the logical channel descriptor;
reforming a plurality of said transmitted frames from said cells; and when an error is identified with a received cell,
setting the end of the data in the data buffer equal to the already received data in the buffer minus the length of the cells of the frame within which the cell with said error belongs;
surfacing the data buffer;
indicating an error; and
allocating a new data buffer;
surfacing multiple ones of said transmitted frames at a same time from within said buffer to a receiving processor.

32. The method of claim 31 wherein the step of storing the cell in a buffer that uniquely corresponds to the logical channel descriptor further includes the steps of:
reading the state of the logical channel descriptor; and
using an existing data buffer pointer that uniquely corresponds to the logical channel descriptor to store the data in the buffer if the state of the logical channel descriptor indicates that the buffer is in progress.

33. The method of claim 32 wherein the step of using an existing data buffer pointer further includes the step of obtaining a new data buffer pointer that uniquely corresponds to the logical channel descriptor if the logical channel descriptor indicates that the buffer is not in progress.

34. A method for surfacing frames that are comprised of a plurality of cells, the method comprising the steps of:
receiving said plurality of cells;
storing data from each received cell into a data buffer;
checking whether an end of frame has occurred;
comparing the length of the data with a threshold if an end of frame has not occurred;
setting a new data store location at the end of the data if the length of the data in the buffer is less than the threshold;
allocating a new buffer if the length of the data in the buffer is greater than the threshold; when an error is identified within a received cell,
setting the end of the data in the data buffer equal to the already received data in the buffer minus the length of the frame just received;
surfacing the data buffer;

indicating an error; and allocating a new data buffer; and surfacing the buffer, wherein multiple frames within said buffer are surfaced at the same time to a receiving processor.

35. The method of claim 34 wherein the step of checking to see if an end of frame has occurred further comprises the step of checking a user indicate bit to see if an error has occurred.

36. The method of claim 34 wherein the step of checking to see if an end of frame has occurred further comprises the step of checking to see if an error has occurred if an end of frame has occurred.

37. The method of claim 35 wherein the step of checking to see if an error has occurred further comprises the step of comparing the length of the data stream and the length of the data stream that has been received to see if an error has occurred.

38. The method of claim 35 wherein the step of checking to see if an error has occurred further comprises the step of checking a CRC 32 bit to see if an error has occurred.

39. A method for surfacing frames that are comprised of a plurality of cells, the method comprising the steps of:

receiving said plurality of cells;

storing said plurality of cells in a data buffer;

monitoring for an end of frame signal;

determining whether an error has occurred within the plurality of cells when an end of frame signal is received; when an error has occurred, setting the end of the data in the data buffer equal to the already received data in the buffer minus the length of the frame just received;

surfacing the data buffer;

indicating an error; and allocating a new data buffer;

comparing the length of data in the data buffer with a threshold if an end of frame signal has not been received and an error has not occurred;

allocating a new buffer if the length of the data in the buffer is greater than the threshold surfacing the buffer wherein multiple ones of said plurality of frames are surface at the same time; and setting the new data store location at the end of the data if the length of the data in the buffer is not greater than the threshold.

* * * * *